United States Patent [19]

Williams, III

[11] Patent Number: 4,802,387

[45] Date of Patent: Feb. 7, 1989

[54] REVERSIBLE UNIDIRECTIONAL TRANSMISSION

[76] Inventor: Thomas A. Williams, III, 4768 S. 6th St., Arlington, Va. 22204

[21] Appl. No.: 934,102

[22] Filed: Nov. 24, 1986

[51] Int. Cl.⁴ .................. E16H 5/52; B25B 17/00
[52] U.S. Cl. ........................ 74/812; 74/134; 74/157; 81/57.31
[58] Field of Search .......... 74/812, 792, 143, 158, 74/159, 161, 168, 134, 33–35, 13 X, 136, 137, 157; 81/62, 57.46, 57.3, 57.31, 57.39, 61, 58.4, 59.1, 60, 63.1

[56] References Cited

U.S. PATENT DOCUMENTS

| | | | |
|---|---|---|---|
| 275,436 | 4/1883 | Tauber | 74/134 |
| 392,610 | 11/1888 | Hoffman | 74/812 |
| 708,286 | 9/1902 | Wild | 74/812 |
| 725,551 | 4/1903 | Gentry | 74/134 |
| 778,855 | 1/1905 | Goldmann | 74/134 |
| 778,856 | 1/1905 | Goldmann | 74/134 |
| 799,946 | 9/1905 | Slocum | 74/126 |
| 825,791 | 7/1906 | Young | 74/812 |
| 832,077 | 10/1906 | Pearce | 74/134 |
| 1,097,571 | 5/1914 | Thurlow | 74/134 |
| 1,351,393 | 8/1920 | Marshall | 74/812 |
| 1,860,914 | 5/1932 | Wellman | 81/57.31 |
| 2,641,136 | 6/1953 | Marspen et al. | 74/792 X |
| 3,467,231 | 9/1969 | Haznar | 81/62 X |
| 3,828,629 | 8/1974 | Moore | 81/57.3 |
| 3,983,759 | 10/1976 | Linden | 81/57.3 X |
| 4,280,379 | 7/1981 | Chow | 81/62 |
| 4,357,844 | 11/1982 | Welbon | 81/57.31 X |
| 4,366,731 | 1/1983 | Vallevand | 81/57.3 |
| 4,426,895 | 1/1984 | Lack | 81/57.31 X |
| 4,507,990 | 4/1985 | Lack | 81/57.31 X |

FOREIGN PATENT DOCUMENTS 567138  5/1958  Belgium .................. 74/379

Primary Examiner—Lawrence Staab
Attorney, Agent, or Firm—Barnes & Thornburg

[57] ABSTRACT

A transmission is provided which has unidirectional output rotation in response to multidirectional input rotation. A reversing member is provided for changing the direction of rotation of the output member. A first mechansim rotates the output member in a first direction in response to a first direction of rotation of the input member, and this first mechanism does not drive the output member in response to a second direction of rotation of the input member. A second mechanism rotates said output member in the first direction in response to the second direction of rotation of the input member, and this mechanism does not drive the output member in response to the first direction of rotation of the input member. The axis of rotation of the input member and the axis of rotation of the output member are coaxial.

27 Claims, 4 Drawing Sheets

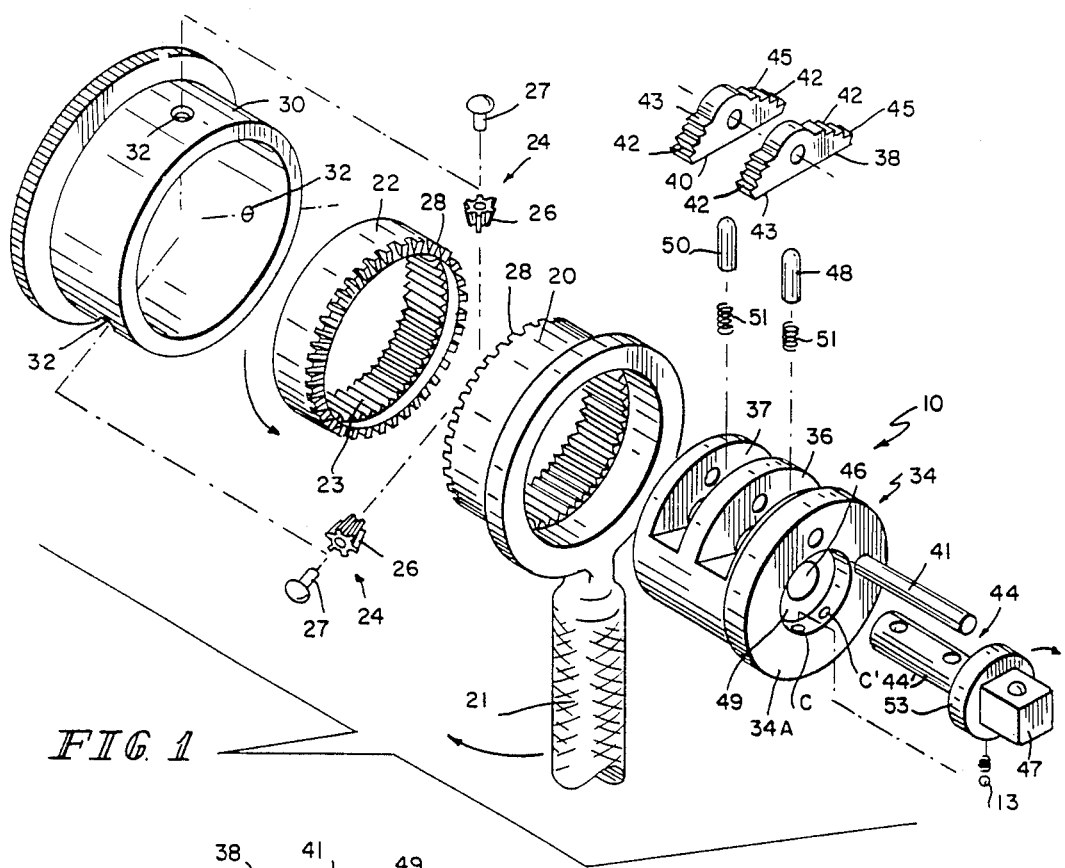
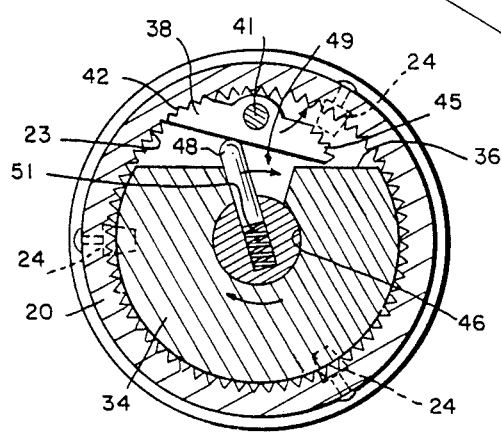
FIG. 1
FIG. 2

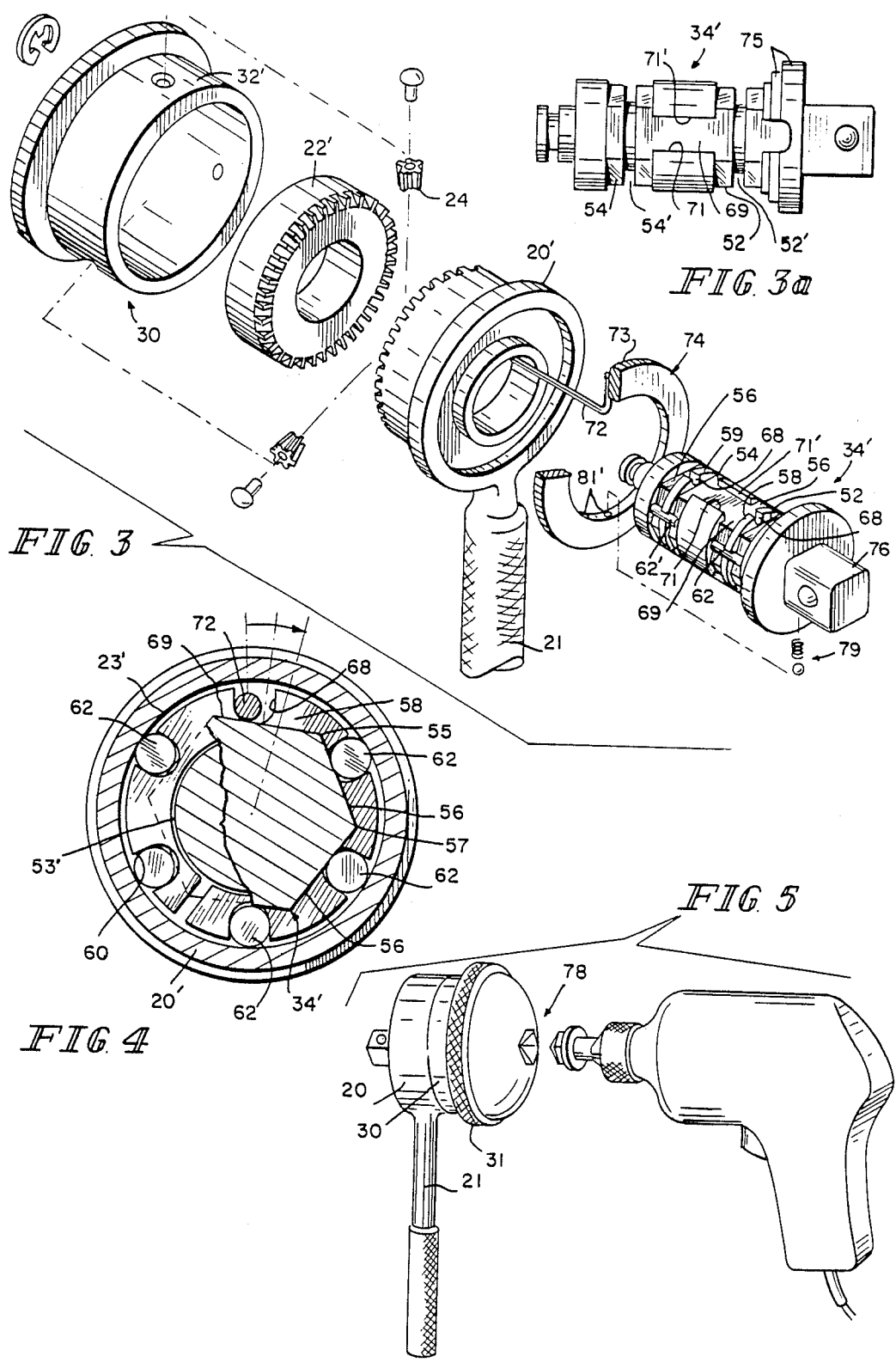

REVERSIBLE UNIDIRECTIONAL TRANSMISSION

BACKGROUND AND SUMMARY OF THE INVENTION

The present invention relates to the transmission of rotation in a single direction to an output member regardless of the direction of rotation of an input member. Further, the invention relates to a novel means for reversing the directional rotation of the output member.

The transmission of reciprocating rotation into a unidirectional output has been accomplished in previous devices. Further, these devices have provided for the reversal of the rotation of this unidirectional output. U.S. Pat. Nos. 799,946; 1,262,772 and 3,580,228 show various arrangements of such transmissions.

The present invention provides for the conversion of multidirectional input into a single directional output and the reversal of this output direction in a very simple arrangement with relatively few moving parts. This arrangement also provides for output and input rotation on a common axis. One application of this arrangement is in hand tools used for rotating objects.

One object of the present invention is to provide a transmission which converts multidirectional input into a unidirectional output.

Another object of the invention is to provide a simple and novel reversing means for reversing the direction of rotation of the output member.

A further object of the present invention is to provide a transmission having coaxial input and output member axes.

Another object of the present invention is to provide a transmission which rotates an output member at a faster rate of rotation than the rate of rotation of the input member.

The above objects are achieved by constructing a transmission having a first means for rotating the output member in a first direction in response to a first directional rotation of an input member and which does not drive the output member in response to a second direction of rotation of the input member. A second means is provided for rotating the output member in the first direction in response to a second direction of rotation of the input member, and this means does not drive the output member in response to the first direction of rotation of the input member. The axis of rotation of the input member and the axis of rotation of the output member are coaxial. A third means is provided for changing the direction of rotation of the output member to a second direction regardless of the direction of rotation of the input member.

Other objects, advantages and novel features of the present invention will become apparent from the following detailed description of the invention when considered in conjunction with the accompanying drawings.

BRIEF DESCRIPTION OF THE DRAWINGS

FIG. 1 is an exploded view of one embodiment of the transmission device.

FIG. 2 is an end cross-sectional view of the output member, engaging member and reversing means of the embodiment of the transmission device shown in FIG. 1.

FIG. 3 is an exploded view of another embodiment of the transmission device.

FIG. 3a is a side view of the output member of FIG. 3.

FIG. 4 is an end cross-sectional view of the output member, engaging means and an annular ring of the embodiment of the transmission device shown in FIG. 3;

FIG. 5 is a side view of the transmission device having a special attachment member;

DETAILED DESCRIPTION OF THE DRAWINGS

Figure 6:
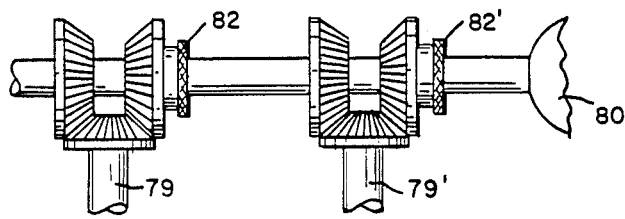
FIG. 6 is a schematic view of another embodiment of the transmission driving means.

With reference to the exploded view in FIG. 1, a transmission 10 includes a first annular ring 20 connected to a handle 21 and aligned adjacent a second annular ring 22. Each annular ring includes axially extending teeth 28 on at least one axial surface and radially extending teeth 23 on at least one circumferential surface. An intermediate pinion 24 having engaging teeth 26 is disposed between annular rings 20 and 22, and teeth 26 of the pinion mesh with corresponding teeth 28 on the annular rings. In the preferred embodiment, three such pinions 24 are arranged in equal distances around the annular rings. Annular ring 22 is enclosed within a holding member 30 and annular ring 20 is partially enclosed in holding member 30 having the portion attached to handle 21 not enclosed. The pinions 24 are positioned inside the holding member 30 and are supported on pins 27 which extend through holes 32 in the holding member 30. In order for the rotation of the input member or handle 21 to be transmitted to the second annular ring 22 via pinion 24, the user grips holding member 30 holding it stationary.

An output member 34 is rotatably disposed within the annular rings 20, 22. The output member 34 has two circumferential slots 36, 37. Slot 36 is disposed underneath annular ring 20 and slot 37 is disposed underneath annular ring 22. A pawl 38 is pivotably mounted within slot 36 and pawl 40 is pivotably mounted within slot 37 on a common pin 41. Each of the pawls has teeth 42 on opposite ends 43, 45 as shown in FIG. 2.

A reversing member 44 is Provided which is received in aperture 46 of the output member 34. The reversing member has a circular plate 53 which is received within mouth 49 of an end plate 34A of the output member which is integral with the output member. The reversing member 44 has an integral head 47 which extends from the circular plate away from the output member 34 and serves as the attachment for elements to be driven. The reversing member 44 has a portion 44' which extends into the aperture 46 of the output member. This portion 44' has a pin 48 associated with pawl 38 and a pin 50 associated with pawl 40. Spring members 51 urge the pins 48 and 50 radially outward into slots 36 and 37, respectively, and against the pawls 38 and 40 respectively.

The circular plate 53 includes a ball spring B on the face of the outer circumference which faces the inner edge of the end plate mouth 49. This edge of the end plate mouth 49 has two indentations C, C' which cooperates with the ball spring B. To drive the output member in the clockwise direction the reversing member 44 is rotated counter clockwise relative to the output member end plate 34A until the ball B engages in indentation C'. To reverse the output to the counter clockwise direction the reversing member 44 is rotated clockwise relative to the output member until the ball spring engages in indentation C. The ball spring will retain the pats in the proper position during operation and is easily disengaged from the indentations when reversal of directions is desired.

In operation, the handle 21 is rotated, thereby rotating annular ring 20 in the same direction in which the handle is moved. Intermeshing pinions 24 transmit motion to annular ring 22 thereby rotating annular ring 22 in a direction opposite to the rotation of annular ring 20. The holding member 30 is held stationary to prevent the pinions 24 from rotating around in the plane of rotation of the annular rings thus allowing transmission of the rotation of the annular rings in opposite directions.

To operate the output member in a clockwise direction relative to FIGS. 1 and 2, reversing member 44 is positioned in aperture 46 so that ball spring B locks into indentation C' of the end plate 34A. Pins 48 and 50 will force ends 43 of pawls 38, 40 above the outer circumferential surface of the output member 34 and ends 45 of pawls 38, 40 below the outer circumferential surface of output member 34. Thus, teeth 42 on end 43 of the pawls 38, 40 will engage teeth 23 of annular rings 20, 22, and teeth 42 on end 45 of the pawls 38, 40 will not engage teeth 23 of the annular rings 20, 22.

When the handle 21 is moved in a clockwise direction, annular ring 20 will move in a clockwise direction. Annular teeth 23 on the inside of annular ring 20 will engage teeth 42 on end 43 of the pawl 38 and will force the output member 34 to rotate in a clockwise direction. Pinion 24 will rotate annular ring 22 in a counterclockwise direction and the teeth 23 of annular ring 22 will ride over the teeth 42 on side 43 of pawl 40 forcing them down into recess 37. Thus, annular ring 22 will not be engaged with output member 34.

When the handle 21 is rotated in a counterclockwise direction, annular ring 20 will rotate in a counterclockwise direction. Teeth 23 of the annular ring 20 will ride over teeth 42 of side 43 of the pawl 38 forcing them down into recess 36. Bevel teeth 28 of annular ring 20 will rotate pinion 24. Pinion 24 will rotate annular ring 22 in a clockwise direction while the holding member 30 is held stationary by the user, and the teeth 23 of annular ring 22 will engage the teeth 42 of side 43 of pawl 40, thereby moving the output member 34 in the clockwise direction.

Thus, the output member 34, in the first mode, rotates in the clockwise direction irrespective of the direction of rotation of the input member 21.

Rotation of the output member in a counterclockwise direction is accomplished by rotating reversing member 44 in aperture 46 until ball spring B locks into indentation C of the end plate 34A, so that pins 48 and 50 urge end 45 of pawls 38, 40 upwardly. The teeth 42 on end 45 of the pawls are thereby forced above the outer circumferential surface of output member 34 and the teeth 42 of end 43 of the pawls are forced below the surface of the outer circumferential surface of output member 34.

When handle 21 is moved in a clockwise direction, annular ring 20 is moved in a clockwise direction, and teeth 23 of annular ring 20 ride over teeth 42 of the pawl 38 and force them down into the recess 36. Bevel teeth 28 of annular ring 20 will rotate pinion 24. Pinions 24 will then rotate annular ring 22 in the counterclockwise direction while the holding member 30 is held stationary by the user. Teeth 23 of annular ring 22 engage teeth 42 of pawl 40 on end 45, thereby moving the output member 34 in a counterclockwise direction.

When the handle 21 is moved in the counterclockwise direction, annular ring 20 is moved in a counterclockwise direction. Teeth 23 of annular ring 20 engage teeth 42 of pawl 38 on end 45 and rotate output member 34 in the counterclockwise direction. Annular ring 22, caused to move in the clockwise direction by pinion 24, rides over teeth 42 of the pawl 40 and forces them down into recess 37. The output member is thus rotated in the counterclockwise direction irrespective of the direction of rotation of the input member 21.

Another preferred embodiment is shown in FIGS. 3, 3A and 4. Output member 34' has two adjacent circumferential grooves 52 and 54 around the perimeter of the output member. The base of grooves 52, 54 have polygonal faces 56. The polygonal faces 56 each have outer ends 55, 57. A flexible roller ring 58 is rotatably disposed within a ring groove 52' within groove 52 and a flexible roller ring 59 is rotatably disposed within a ring groove 54' within groove 54 (shown in FIG. 3a). The roller rings 58, 59 can have a slit to allow them to be slipped over the output member into the roller ring grooves. Roller ring 58 is associated with annular ring 20' and roller ring 59 is associated with annular ring 22'. Each roller ring has slots 60 spaced apart on its outer circumference. Rollers 62, 62' are disposed in the slots 60 of roller rings 58, 59 respectively and contact faces 56 of the polygonal grooves. When the rollers are positioned in the middle of faces 56 of the polygonal grooves they do not engage the annular rings 20', 22'. However, as the rollers are moved toward either end 55, 57 of the faces of the polygonal grooves, the outer diameter of the rollers extend above the outer diameter of the output member 34', and rollers 62 contact the annular ring 20' and rollers 62' contact annular ring 22'.

In one of the slots 60 of each roller ring a reversing pin slot 68 is disposed. A reversing member 74 has a ring 73 and a pin 72 which is inserted into reversing pin slot 68 of each roller ring 58, 59. The ring 73 has a raised inner lip 73' and an inner ring surface 73". The output member 34' includes an integral tiered plate 75 which is rotatably received within the inner lip 73' and inner ring surface 73" of the reversing member ring 73. The reversing pin 72 is positioning in a recessed portion 69 of the outer circumference of the output member 34' and is parallel to the output member. This recessed portion has a surface continuous with one of the faces 56 of the polygonal groove.

In operation, the reversing member 74 is rotated until reversing pin 72 abuts edge 71 or edge 71' of the recessed portion 69 of the output member 34'. The reversing pin 72 positions the roller rings 58, 59 relative to the output member 34', and once placed in an operative position against edge 71 or edge 71', prevents the roller rings 58, 59 from rotating relative to the output member 34'. The output member 34' includes a snapping spring ball lock device 79 which engages in indentations 81, 81' in the inner surface 73" of the reversing ring 73, to hold the pin 72 in Position against edge 71 or edge 71'.

For clockwise output-member rotation, the reversing ring 73 is rotated clockwise with respect to output member to snap the spring ball device 79 into indentation 81. For counter clockwise output member rotation, the reversing ring 73 is rotated counter clockwise with respect to the output member to snap the spring ball device 79 into indentation 81'.

In another preferred embodiment the reversing member 74 and the roller rings 58, 59 are unitary.

In operation, as with the first embodiment discussed, the handle 21 is rotated thereby rotating annular ring 20' in the same direction that the handle is rotated. Intermeshing pinions 24 transmit motion to annular ring 22' thereby rotating annular ring 22' in a direction opposite to the rotation of annular ring 20'. The holding member 30 is held in place to prevent the pinions 24 from rotating around in the plane of rotation of the annular rings.

To operate the output member in a clockwise direction relative to FIGS. 3 and 4, the reversing ring 73 is rotated clockwise until reversing pin 72 is moved against edge 71' of the recessed portion 69 of the output member 34'. When the handle 21 is moved in clockwise direction, annular ring 20' will move in a clockwise direction. The inner surface 23' of annular ring 20' will roll the rollers 62 toward outer edges 57 of the polygonal faces 56 enough to wedge the rollers between the annular ring 20' and the polygonal faces 56. Thus, output member 34' will rotate with the annular ring 20'. Pinion 24 will rotate annular ring 22' in the counterclockwise direction thus spinning the rollers 62' in a counterclockwise direction. The reversing pin 72 inserted in reversing slots 68 of the roller rings 58, 59 will prevent the roller rings from rotating in the counterclockwise direction. The flexibility of the roller ring 59 allows the rollers 62' to spin freely as the annular ring 22' rotates in the counterclockwise direction. Therefore, the output member will only be rotated in a clockwise direction.

When the handle is rotated in a counterclockwise direction, annular ring 20' will rotate in a counterclockwise direction. The rollers 62 will thus be rotated in a counterclockwise direction and will spin freely due to the flexibility of roller ring 58. Pinion 24 will rotate annular ring 22' in a clockwise direction, thus spinning the rollers 62' of the roller ring 59 in a clockwise direction and urging the rollers 62' toward the outer end 57 of the faces 56 of the polygonal groove 54. The rollers 62' become wedged between the outer end 57 of the faces 56 of the polygonal groove 54 and the annular ring 22', thereby output member 34' is moved in the clockwise direction.

To reverse the direction of the output member to the counterclockwise direction, the reversing member ring 73 is rotated so that reversing pin 72 abuts edge 71 of the recessed portion 69 of the output member 34'. Because the reversing pin 72 is received in slots 68 of the roller rings 58, 59, these rings will be rotated into a position so that rollers 62, 62' will be moved close to outer ends 55 of the faces 56 of the polygonal grooves 52, 54.

As the handle 21 is rotated in the clockwise direction annular ring 20' rotates in the clockwise direction. The rollers 62 in roller ring 58 will be rotated in the clockwise direction and the flexibility of the roller ring 58 will allow free spinning of the rollers 62. Pinion 24 will rotate annular ring 22' in a counterclockwise direction thereby rolling the rollers 62' in a counterclockwise direction. The rollers 62' will become wedged between the annular ring 22' and the faces 56 of the polygonal groove 54. The output member 34' will thus be rotated in the counterclockwise direction.

When the handle is rotated in the counterclockwise direction, annular ring 20' will rotate in a counterclockwise direction. The rollers 62 will be rotated in a counterclockwise direction and will roll toward the outer ends 55 of the faces 56 of the polygonal groove 52 thus forcing the rollers 62 to become wedged between faces 56 of the groove 52 and the annular ring 20'. Pinion 24 will rotate annular ring 22' in a clockwise direction thereby rolling the rollers 62' in a clockwise direction. The flexibility of roller ring 59 will allow free spinning of the rollers 62' in the clockwise direction. Therefore, the output member 34' will only be rotated in the counterclockwise direction regardless of the direction of rotation of the input member.

In another embodiment of the invention springs can be placed between the housing and the annular ring 22' not attached to the handle to bias this annular ring against the pinions and the other annular ring 20'.

In one application of this device, the transmission is used in a hand tool for rotating sockets. As shown in the embodiment in FIG. 1, reversing head 47 of reversing member 44 would extend past an outside face of the output member 34. The head 47 of reversing member 44 has a parallelepiped shaped end which is keyed into recesses on the back of sockets as is commonly known in this hand tool area. The reversing member 44 is thus rotated in the direction of output member 34. In the roller arrangement embodiment, an engaging member 76 is located on the output member 34' and engages a recess on sockets as is commonly known in the art.

In another application as shown in FIG. 5, an end portion 78 is provided to receive an electric drill bit adapted for driving the apparatus. In this embodiment the handle 21 would be held against rotation and the holding member 31 would be rotated by the electric drill. A hand held bar could also be provided to rotate the holding member 31. By holding the handle 21 stationary and driving the holding member 31, the pinion 24 revolves in a rotational plane parallel to the rotational plane of the annular rings 20 and 22 and drives annular ring 22. The arrangement of the gears would result in the output member rotating in the same direction as the rotation of the holding member 31, but at a different rate of rotation speed depending on the relative diameters of the annular rings 20 and 22.

In a further application as shown in FIG. 6, a plurality of output means 79, 79' transverse to said input means 80 are provided. Each of the output means has a separate reversing means 82, 82' for determining the direction of rotation independently from the other output means.

Figure 7:
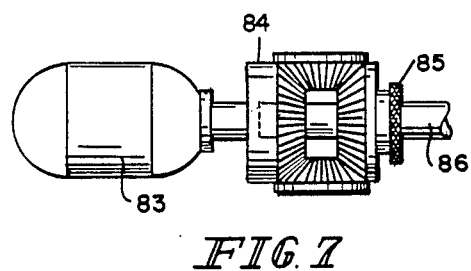
FIG. 7 is a schematic view of another embodiment of the transmission driving means.

In a further application as shown in FIG. 7, motor 83 is attached to one of the annular rings 84. A reversing mechanism 85 such as those discussed above is provided to change the direction of rotation of an output member 86 when the input rotational direction from the motor remains the same.

Figure 8:
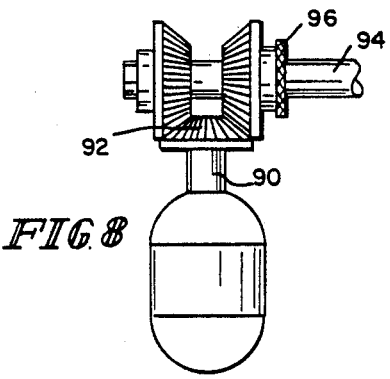
FIG. 8 is a schematic view of another embodiment of the transmission driving means.
Figure 8A:
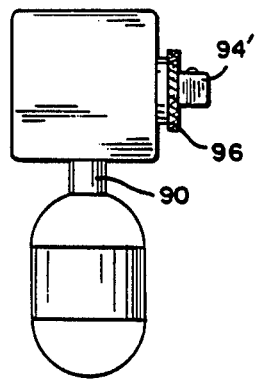
FIG. 8a is a schematic view of another embodiment of the transmission driving means.

In a further application as shown in FIG. 8, the input member 90 is attached to an intermediate pinion 92 transverse to an output member 94. The reversing means 96 is attached to the output member 94. Thus, in an embodiment as shown in FIG. 8a, the transmission can be used as a reversing feature for a unidirectional engine, for example, an electric hand drill. The electrical drill serves as an input member 90'. The reversing means 96 is attached to the output member 94'.

Figure 9:
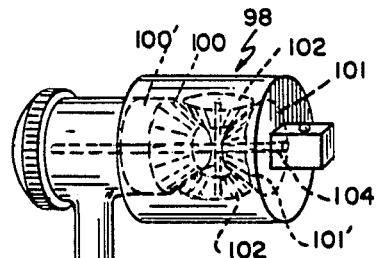
FIG. 9 is a schematic view of another embodiment of the transmission driving means.

In a further application as shown in FIG. 9, the output means 98 is external to the annular rings 100,101. These annular rings 100, 101 have engaging surfaces 100', 101' respectively, which interact with the output means 98. Intermediate pinions 102 are rotatably mounted on an axle 104 attached to a handheld stationary member 104'.

Figure 10:
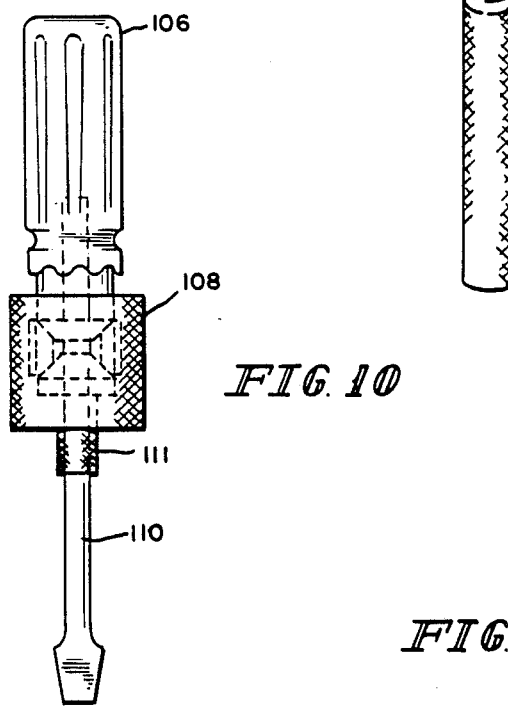
FIG. 10 is a schematic view of another embodiment of the transmission device.

In a further application as shown in FIG. 10, a screwdriver handle 106 is attached to annular ring 108. A screwdriver head or a nutdriver is attached to the output member 110. A reversing member 111 is also provided.

Figure 11:
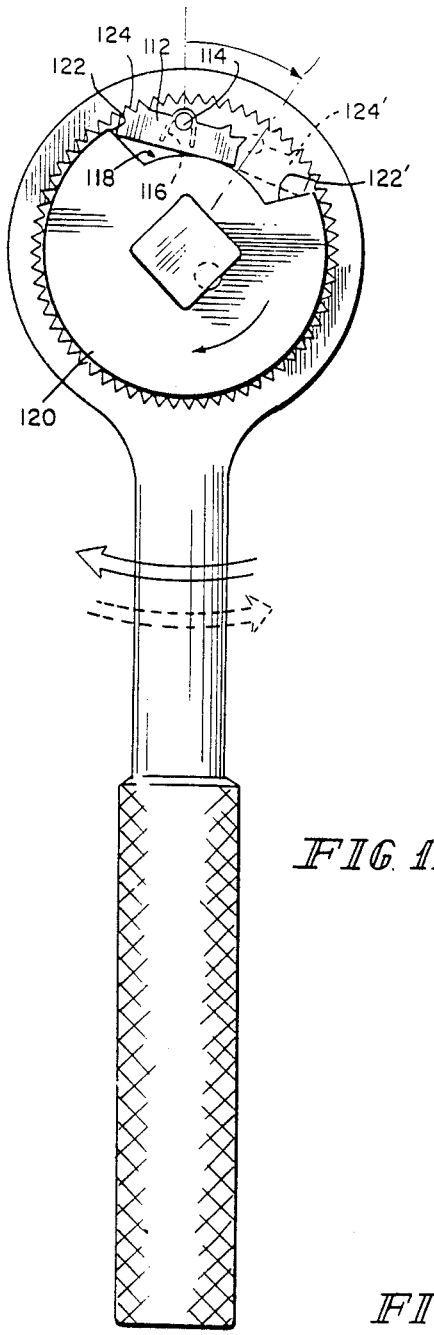
FIG. 11 is a schematic view of another embodiment of the reversing means of the transmission device.

In a further application as shown in FIG. 11, another embodiment of the engaging and reversing members is shown. The pawls 112 are held in place by pin 114 and spring members 116. The pawls 112 are placed within a groove 118 in the output member 120. The groove has cam surfaces 122 and 122' at opposite ends 124, 124' of the pawls 112. The pin 114 positions the pawls 112 to facilitate clockwise output member rotation by placing the ends 124' of the pawls 112 against cam surface 122' of the output member. When the annular rings are rotated in the clockwise direction, the ends 124 of the pawls 112 engage with the annular rings and thereby rotate the output member in the clockwise direction. When the annular rings are rotated in the counter clockwise direction, the ends 124 of the pawls 112 recede toward the groove 118, thereby allowing free rotation of the annular rings in the counterclockwise direction.

For counterclockwise rotation of the output member, the pin 114 is moved toward cam surface 122, and thus moves ends 124 of the pawls toward cam surface 122 of the output member 120. This cam surface urges ends 124' of the pawls 112 toward the annular rings. When the annular rings are rotated in the counterclockwise direction, these annular rings engage the pawls 112 thereby rotating the output member 120 in the counterclockwise direction. When the annular rings are rotated in the clockwise direction, the ends 124' of the pawls 112 recede toward the groove 118, thereby allowing free rotation of the annular rings in the clockwise direction.

Figure 12:
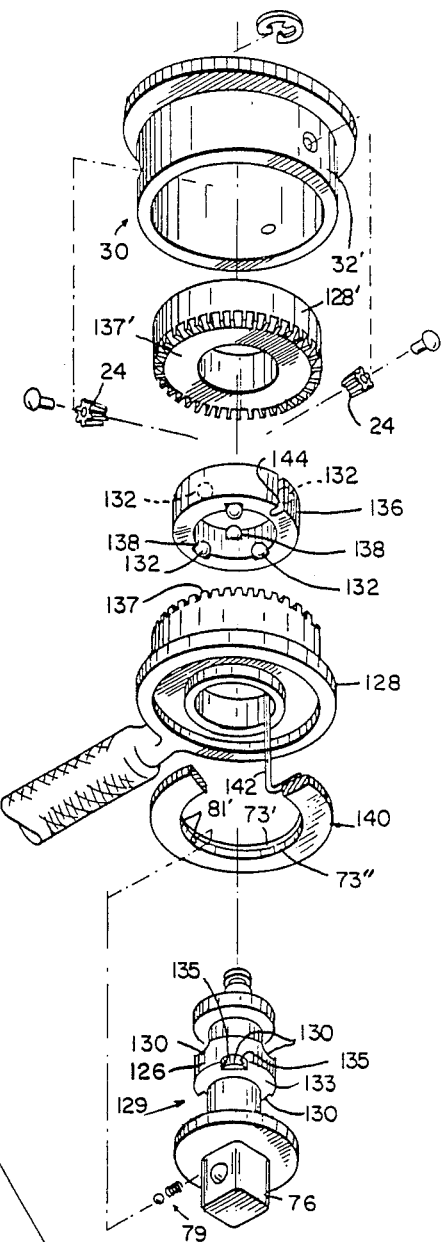
FIG. 12 is an exploded view of another embodiment of the engaging means of the transmission device.

In a further application as shown in FIG. 12, the engaging disc 126 is disposed between the annular rings 128 and 128'. Roller indentations 130 are provided on each surface of the engaging disc 126 facing annular rings 128 and 128'. These indentations are concave toward the annular rings and terminate into the faces 133 of the engaging disc 126 at opposite sides 135 and 135'. Rollers 132 are disposed in these roller indentations 130 in between the engaging disc 126 and the annular rings 128, 128'. A positioning ring 136 surrounds the engaging disc 126. The positioning ring 136 has slots 138 for positioning the rollers 132 in the indentations 130. The positioning ring 136 is attached to a reversing control ring 140 by a pin 142 which is positioned in groove 144 of the positioning ring 136.

In the first position, the control ring 140 is moved clockwise to rotate the positioning ring 136 and thereby move the rollers 132 toward the terminating area 135 of the indentations 130. In this position, in response to clockwise rotation of the input member 128, the rollers 132 engage between engaging surfaces 137, 137' of the annular rings 128, 128' rotating in the clockwise direction and the engaging disc 126 connected to the output member 129. In response to the counterclockwise rotation, the rollers 132 allow free rotation of the annular rings 128, 128'.

In the second position, the control ring 140 is moved counterclockwise to rotate the positioning ring 136 counterclockwise, and thereby move the rollers 132 toward the terminating area 135' of the indentations 130. In response to counterclockwise rotation of the annular rings 128, 128', the rollers engage between the engaging surfaces 137, 137' of the annular rings 128, 128' and the engaging member 126 connected to the output member 129. The rollers 132 allow free rotation of the annular rings rotating in the clockwise direction.

Therefore, while I have shown and described specific embodiments in accordance with the present invention, it should be understood that the same is not limited thereto, but is susceptible of numerous changes and modifications as known to those skilled in the art, and I therefore do not wish to be limited to the details shown and described herein, but rather, intend to cover all such changes and modifications as are encompassed by the scope of the appended claims.

What is claimed is:

1. A transmission comprising:
    an output member;
    first means rotating in a first direction for driving said output member in a first direction in response to a first direction of rotation of said input member, said first means rotating in a second direction and not driving said output member in response to a second direction of rotation of said input member;
    second means rotating in a first direction for driving said output member in said first direction in response to the second direction of rotation of said input member, said second means rotating in a second direction and not driving said output member in response to the first direction of rotation of said input member;
    third means for changing the rotation of said output member to a second direction by changing said first means to rotate in said second direction for driving said output member in said second direction in response to said second direction of rotation of said input member and said first means to rotate in said first direction and not driving said output member in response to the first direction of rotation of said input member, and by changing said second means to rotate in said second direction for driving said output member in said second direction in response to said first direction of rotation of said input member and said second means to rotate in said first direction and not driving said output member in response to the second direction of rotation of said input member;
    intermediate means for rotating said first means in said first direction and rotating said second means in said second direction in response to said first direction of rotation of said input member, and for rotating said first means in said second direction and said second means in said first direction in response to said second direction of rotation of said input member; and
    holding means for enabling said intermediate means to cause said second means to be rotated by said input member in the opposite rotational direction of said input member and for disabling said intermediate means thereby not causing said second means to be rotated by said input member in the opposite rotational direction of said input member.

2. A transmission as in claim 1, including a plurality of output means transverse to said input member, each of said output means having a reversing means for determining the direction of rotation independently from other output member.

3. A transmission as in claim 1, wherein said input member is connected to said first means and drives said second means via said intermediate means.

4. A transmission as in claim 3, wherein said input member includes a handle extending from said first means and said output member includes one of attachment means for attaching a screwdriver and attachment means for attaching nutdriver.

5. A transmission as in claim 1, wherein said intermediate means includes at least one pinion between said first and second means and includes an attachment means for attaching said holding means to an external source of rotation to drive said second means when the input member is prevented from rotating in the direction of rotation of said holding means.

6. A transmission as in claim 1, including engaging means interconnecting said first and second means to said output member and having a first position for rotating said output member in said first direction in response to rotation of said first means in a first direction and rotation of said second means in said first direction, and for allowing free rotation of said first means and said second means in said second direction;

said engaging means having a second position for rotating said output member in said second direction in response to rotation of said first means in a second direction and rotation of said second means in said second direction, and for allowing free rotation of said first means and said second means in said first direction;

said third means controlling said position of said engaging means.

7. A transmission as in claim 6, wherein said first means includes a first disk and said second means includes a second disk, each of said disks having gripping surfaces for engaging said engaging means.

8. A transmission as in claim 7, wherein said input member is connected to said first disk and including at least one intermediate pinion interconnecting said first disk and said second disk to transfer the motion of said input member from said first disk to said second disk.

9. A transmission as in claim 8, wherein said holding means is connected to said pinion for preventing said pinion from being rotated in the rotational plane of the disks to cause said second means to be rotated in the opposite rotational direction of said input member when activated and for permitting said pinion to be rotated in the rotational plane of the disks thereby not causing said second means from being rotated in the opposite rotational direction of said input member when deactivated.

10. A transmission as in claim 7, wherein said engaging means includes:

a central disk having a first surface facing toward said first disk and a second surface facing toward said second disk;

said first and second surfaces each including at least one roller indentation for receiving engaging rollers; and a reversing means in said first position of the engaging means for wedging said rollers between the roller indentation of said central disk and said first and second disks in response to rotation of said first and second disks in said first direction and for allowing free rotation of said first and second disks rotating in said second direction thereby rotating said output member in said first direction irrespective of the direction of rotation of said input member, and in said second position of the engaging means for wedging said rollers between the roller indentation of said central disk and said first and second disks in response to rotation of said first and second disks in said second direction and for allowing free rotation of said first and second disks rotating in said first direction, thereby rotating said output member in said second direction irrespective of the direction of rotation of said input member.

11. A transmission as in claim 10, wherein said first disk is coaxial with said second disk, each of said first disk and said second disk having a gripping surface facing toward the other disk; and wherein said central disk is axially adjacent and in between said first and second disks, said central disk having at least one roller indentation facing toward the gripping surface of each disk.

12. A transmission as in claim 10, wherein said first and second disks are annular rings having circumferential gripping surfaces, said annular rings being concentric to said central disk; and wherein said central disk has at least one roller indentation on the circumference of the central disk facing each of said annular rings; and including at least a first roller being in contact with said gripping surface of the first annular ring and at least a second roller being in contact with said gripping surface of the second annular ring.

13. A transmission as in claim 12, wherein said first and second disks are annular rings having annular gripping surfaces; and wherein said engaging means further comprises:

a circumferential groove in said central disk having a multi-face polygonal bottom;

a plurality of rollers, a pair of said rollers being associated with and contacting each face; and a first roller being in contact with said gripping surfaces of the first annular ring and a second roller being in contact with said gripping surface of the second annular ring.

14. A transmission as in claim 7, wherein the input member is attached to one of said disks and said engaging means is disposed on said output member.

15. A transmission as in claim 1, wherein:

said first means includes a second annular ring concentric to said output member spaced from and in a parallel plane to said first annular ring and having a gripping surface; and said intermediate means includes at least one pinion engaging said first annular ring and said second annular ring such that the first annular ring and second annular ring rotate in opposite directions; and further comprising at least one circumferential groove in said output member having a multi-faced polygonal bottom;

a plurality of rollers, a pair of said rollers being associated with and contacting each side of the polygonal face; a first roller being in contact with said gripping surface of the first annular ring and a second roller being in contact with said gripping surface of the second annular ring; and a reversing means having a first position for wedging said rollers between the polygonal faces of said output member and said first and second annular rings in response to rotation of said first and second annular rings in said first direction and for allowing free rotation of said first and second annular rings rotating in said second position for wedging said rollers between said polygonal faces of said output member and said first and second annular rings in response to rotation of said first and second annular rings in said second direction and for allowing free rotation of said first and second annular rings rotating in said first direction thereby turning said output member in said second direction irrespective of the direction of rotation of said input member.

16. A transmission as in claim 15, wherein said reversing means includes:

at least one ring groove included in the bottom faces of said circumferential groove in said output member;

a first roller ring associated with said first annular ring an a second roller ring associated with said second annular ring, each of said roller rings being rotatably mounted in said ring groove in between said ring groove and said annular rings;

a plurality of slots in said roller rings, one slot being associate with each side of the polygonal groove face, each slot having an associated roller disposed therein, said rollers positioned between said annular rings and said polygonal faces of the groove;

a roller ring positioning means for positioning the roller rings in a first position for allowing wedging of said rollers between said annular rings and said sides of the polygonal groove only in response to the first direction of rotation of said first and second annular rings, and having a second position for allowing wedging of said rollers between said annular rings and said polygonal faces only in response to the second direction of rotation of said first and second annular rings.

17. A transmission as in claim 16, wherein said roller ring positioning means includes:

a pin;

at least one pin slot in each roller ring in between two of the roller slots;

a longitudinal groove in an outer face of said output member for receiving said pin, said groove having a first side surface and a second side surface toward which said pin moves;

wherein said pin is placed toward said first side surface of the longitudinal groove in said first position of the reversing means, said pin preventing rotation of said roller rings relative to said output member and preventing said rollers from wedging between said annular rings and said output member in response to rotation of said first and second annular rings in said second direction, and said pin allowing the wedging of the rollers between said annular rings and said output member in response to rotation of said first and second annular rings in said firs direction; and wherein said pin is placed toward said second side surface of the longitudinal groove in said second position of the reversing means, said pin preventing rotation of said roller rings relative to said output member and preventing said rollers from wedging between said annular rings and said output member groove in response to rotation of said first and second annular rings in said first direction, and said pin allowing the wedging of the rollers between said annular rings and said output member in response to the rotation of said first and second annular rings in said second direction.

18. A transmission as in claim 1, wherein said third means is disposed on said output member.

19. A transmission as in claim 1, further including separate engaging means associated with each of said first means and said second means for engaging said first means and said second means with said output member, each of said engaging means operating independently of the other engaging means, each of said engaging means remaining essentially stationary along the axis of rotation.

20. A transmission comprising:

an input member;

an output member;

a first concentric member concentric to said output member and attached to said input member;

a second concentric member concentric to said output member spaced from and in a parallel plane to said first concentric member;

at least one pinion engaging said first concentric member and said second concentric member;

a first pawl disposed on said output member, said first pawl being associated with said first concentric member;

a second pawl disposed on said output member, said second pawl being associated with said second concentric member; and reversing means having a first position for engaging each of said pawls with said concentric members in response to a first direction of rotation of said concentric members and for is engaging each of said pawls from said concentric members in response to a second direction of rotation of said concentric members and having a second position for engaging each of said pawls with said concentric members in response to a second direction of rotation of said concentric members and for disengaging each of said pawls from said concentric members in response to a first direction of rotation of said concentric members, wherein said output member rotates in the direction in which the engaged concentric members rotate thereby rotating said output member in a single direction irrespective of the rotation of said input member.

21. A transmission as in claim 20, including:

a gripping surface on each concentric member;

a first end of each pawl having a gripping surface for engaging said concentric members in response to a first direction of rotation of said concentric members, in said first position of said reversing means; and a second end of each pawl having a gripping surface for engaging said concentric members in response to a second direction of rotation of said concentric members, in said second position of said reversing means.

22. A transmission as in claim 21, wherein said reversing means includes a cam means for urging said first end gripping surfaces of said first an second pawls against said concentric members for engaging the output member with the concentric members, in said first position of the reversing means; and for urging said second end gripping surfaces of said first and second pawls against said concentric members for engaging the output member with the concentric members, in said second position of the reversing means.

23. A transmission as in claim 22, wherein said pawls are held on a fixed axis of rotation relative to said output member and wherein said cam means includes spring means on said output member for forcing said pawls to rotate around said fixed axis for engaging the output member with the concentric members, said first and second position for the reversing means being changed by moving said spring means from a position towards one end of said pawls to a position towards the other end of said pawls.

24. A transmission as in claim 21, wherein:
said reversing means includes at least one groove in said output member in which said pawls are disposed;
said groove having a first cam surface adjacent to the first end of the pawls and a second cam surface on said output member adjacent the second end of said pawls;
said first cam surface in said first position of the reversing means, for engaging said first end of said first and second pawls and thereby urging said second end gripping surfaces of said first and s con pawls against said concentric members for engaging the output member with the concentric members; and
said second cam surface in said second position of the reversing means, for engaging said second end of said first and second pawls and thereby urging said first end gripping surface of said first and second pawls against said concentric members for engaging the output member with the concentric members.

25. A transmission as in claim 24, wherein said pawls are held on a movable axis of rotation wherein, in said first position of the reversing means, said axis is moved toward said first am surface there by positioning said first end of the pawls against said first cam surface urging said second end of said pawls to engage with said concentric members rotating in said first direction and, in said second position of the reversing means, said axis is moved toward said second cam surface thereby positioning said second end of said pawls against said second cam surface urging said first end of said pawls to engage with said concentric members rotating in said second direction.

26. A transmission comprising:
an input member;
an output member;
first rotatable means attached to said input member;
second rotatable means freely rotatable with respect to said first rotatable means;
intermediate means for rotating said first means in a first direction and rotating said second means in a second direction in response to said first direction of rotation of said input member, and for rotating said first means in said second direction and said second means in said first direction in response to a second direction of rotation of said input member;
engaging means for directly engaging between one of said first means and said output member and between said second means and said output member depending on the direction of rotation of said first means an said second means thereby transferring rotation of said first means and said second means to said output member;
reversing means providing a first position of said engaging means such that said engaging means transfers rotation of said input member in both said first and said second direction to rotate said output member in said first direction and providing a second position of said engaging means such that said engaging means transfers rotation of said input member in both said first and said second direction to rotate said output member in said second direction; and
holding means for enabling said intermediate means to cause said second means to be rotated by said input member in the opposite rotational direction of said input member and for disabling said intermediate means thereby not causing said second means to be rotated by said input members in the opposite rotational direction of said input member thereby providing only direct engagement between said first means and said engaging means.

27. A transmission comprising:
an input member;
an output member;
a first concentric member concentric to said output member and attached to said input member;
a second concentric member concentric to said output member spaced from and in a parallel plane to said first concentric member;
at least one pinion engaging said first concentric member and said second concentric member;
a first pawl disposed on said output member, said first pawl being associated with said first concentric member;
a second pawl disposed on said output member, said second pawl being associated with said second concentric member;
reversing means having a first position for engaging each of said pawls with said concentric members in response to a first direction of rotation of said concentric members and for disengaging each of said pawls from said concentric members in response to a second direction of rotation of said concentric members and having a second position for engaging each of said pawls with said concentric members in response to a second direction of rotation of said concentric members and for disengaging each of said pawls from said concentric members in response to as first direction of rotation of said concentric members in response to a first direction of rotation of said concentric members, wherein said output member rotates in the direction in which the engaged concentric members rotate thereby rotating said output member in a signal direction irrespective of the rotation of said input members; and
a holding means connected to said pinion when activated for preventing said pinion from being rotated in the rotational plane of the concentric members such that said second connecting member is caused to rotate in the opposite rotational direction of said input member and when deactivated for permitting said pinion to be rotated in the rotational plane of the concentric members thereby not causing said second means to be rotated in the opposite rotational direction of said input member.

* * * * *